United States Patent
Yoshida (10) Patent No.: US 6,870,689 B2
(45) Date of Patent: Mar. 22, 2005

(54) PROJECTION ZOOM LENS SYSTEM AND PROJECTOR

(75) Inventor: Masashi Yoshida, Chino (JP)

(73) Assignee: Nittoh Kogaku K.K. (JP)

(*) Notice: Subject to any disclaimer, the term of this patent is extended or adjusted under 35 U.S.C. 154(b) by 0 days.

(21) Appl. No.: 10/643,671

(22) Filed: Aug. 19, 2003

(65) Prior Publication Data

US 2004/0109239 A1 Jun. 10, 2004

(30) Foreign Application Priority Data

Aug. 21, 2002 (JP) ........................................ 2002-240022

(51) Int. Cl.[7] ............................................. G02B 15/14
(52) U.S. Cl. ........................ 359/683; 359/649; 359/676
(58) Field of Search ................................ 359/683, 676, 359/649–651

(56) References Cited

U.S. PATENT DOCUMENTS

| | | | |
|---|---|---|---|
| 5,841,587 A | 11/1998 | Moskovich | ................ 359/662 |
| 5,900,987 A | 5/1999 | Kreitzer | ..................... 359/649 |
| 6,137,638 A | * 10/2000 | Yamagishi et al. | ......... 359/682 |
| 6,147,812 A | 11/2000 | Narimatsu et al. | .......... 359/691 |
| 6,580,564 B2 | * 6/2003 | Nagahara | ..................... 359/683 |
| 6,587,279 B2 | 7/2003 | Narimatsu et al. | .......... 359/683 |
| 2002/0181120 A1 | * 12/2002 | Nagahara | ..................... 359/683 |

* cited by examiner

Primary Examiner—Georgia Epps
Assistant Examiner—M. Hasan
(74) Attorney, Agent, or Firm—Thompson Hine LLP (57) ABSTRACT

A projection zoom lens system that is suited to a projector with a DMD is provided. The zoom lens system includes a fixed fifth lens group that is positioned on the light modulator side and is used as the field lens that transmits the illuminating light and the projection light and a first lens group for focusing that is fixed during zooming, and is constructed of five groups arranged in negative, positive, positive, negative, positive order from the screen side. The third lens group moves significantly during zooming as a variator, the second and fourth lens groups travel only so small distances as compensators but can correct various aberrations so well. Therefore, the movement of the fourth lens group that is the entrance pupil for the projection light outputted from the light valve is small, so that the active projection light is efficiently taken in and a projection zoom lens system that can project bright, clear images can be provided.

8 Claims, 9 Drawing Sheets

PROJECTION ZOOM LENS SYSTEM AND PROJECTOR

BACKGROUND OF THE INVENTION

1. Technical Field

The present invention relates to a projection zoom lens system of a projector apparatus that enlarges and projects an image using a light valve, onto a screen.

2. Description of the Related Art

Conventionally, a liquid crystal panel is often used as the light valve of a projector. In recent years, in place of a liquid crystal panel, apparatuses equipped with a plurality of elements and forms an image by mechanically changing the direction of reflection of light using a micromachining technique have been realized. One example of such an apparatus is a DMD (digital mirror device or display) in which minute mirror-surface elements (micromirrors) are arranged in an array corresponding to pixels and image is formed by controlling the angles of the respective mirror surfaces. Compared to a liquid crystal panel, a light modulator (light valve) in which pixels are composed of micromirrors has faster response and produces a brighter image, so that such light modulator is suited to the realization of a compact projector with high luminance and high image quality.

In a DMD, the micromirrors rotate for making an image around ±12 degrees, so that illuminating light (source light) provided from an illumination optical system (light source system) is converted into effective or active reflected light (modulated light or projection light) that is active for forming an image and non-effective or inactive reflected light that is not active for forming the image. Accordingly, a projector that uses a DMD as a light valve requires a projection lens or lens system that catches (takes in) the active reflected light (referred to as "active light" or "projection light") and does not catch (does not take in) the inactive reflected light (referred to as "inactive light"). In addition, in order to reduce the image circle, the projection lens should be preferably set in the direction of a normal for the DMD. Accordingly, limitations are placed on the arrangement of the illumination optical system that inputs illuminating light into the DMD and the projection lens system that outputs the projection light. Namely, in order to input the active light from the DMD into the projector lens as described above, it is necessary to dispose the illumination optical system and the projection lens system in approximately the same direction.

There are also demands to make projector apparatuses that use a DMD smaller or more slimline. The use of compact lenses with small diameters as the projector lens is being studied. A projection lens system comprising a convex lens (a field lens) placed on the front side of the light valve, which is the light modulating apparatus, is studying for simplifying and compacting the lens system. In this lens system, the convex lens that places on the front side of light valve is used as part of both the illumination optical system and the projection lens system for simplifying the illumination optical system, and aberration correcting of the projection lens system.

A projector zoom lens system including the field lens placed in front of the light valve for using in both the illumination optical system and the projection optical system should be suited to a projector. However, suitable, practical or usable configuration of such lens system has not been disclosed yet. It is therefore an object of the present invention to provide a favorable projection zoom lens for a projector that uses such a field lens. It is a further object to provide a projector apparatus that is compact but is equipped with a zoom function.

SUMMARY OF THE INVENTION

In a projection zoom lens system that includes the field lens placed in front of a light modulator and projects projection light from a light modulator, such as a DMD, that includes a plurality of elements that form an image by changing directions of reflection of illuminating light from an illumination optical system, onto a screen, it is necessary for a lens group on the screen side of the field lens to have a function for taking in the active light and not taking in the inactive light. Accordingly, at a wide-angle end and a telephoto end, it is preferable for the entrance pupil position, at which the projection light (active light or modulated light) that is reflected from the light modulator is taken in, to not move or to hardly move. This means that the lens group positioned on the screen side of the field lens cannot be a zooming or variable-power lens group. The zooming or variable-power lens group is called a variator and its variable-power effect is mainly achieved by moving. Also, another lens group that is closest to the screen needs to move to perform focusing. Accordingly, if this lens group moves during zooming, it becomes necessary to simultaneously perform focusing and zooming, so that the mechanism becomes complex and it is not possible to provide a compact lens system.

Present invention provides a zoom lens system comprising a five-groups construction in which a first lens group on the screen side is used for focusing and is fixed during zooming, a third lens group is mainly used as a variator, a fifth lens group is fixed as the field lens, and a second and fourth lens groups are mainly used as compensators. That is, the projection zoom lens system of the present invention projects projection light from the light modulator, which includes a plurality of elements and forms an image by changing directions of reflection of illuminating light from an illumination optical system by the plurality of elements, onto a screen, and includes first, second, third, fourth, and fifth lens groups in this order from the screen side. The fifth lens group is a shared or common lens group that is disposed on the front side of the light modulator, transmits the illuminating light (source light) and the projection light (modulated light), and does not move during zooming. Therefore, the fifth lens group is used as the field lens.

The first lens group is used as a focusing lens group that moves in order to adjust focus and does not move during zooming. The third lens group is a zooming or variable-power lens group whose zooming effect is mainly produced by movement. Therefore, the third lens group is used as a variator. The second and fourth lens groups are compensating lens groups that mainly compensate aberrations when zooming is carried out through movement. Therefore, the second and fourth lens groups are used as compensators.

In the projection zoom lens system of the present invention, the fourth lens group acts as a compensator and even if the fourth lens group moves to compensate aberrations during zooming, the distance moved is so small. This means that the moving distance of the position of the entrance pupil, into which the projection light enters from the light modulator via the field lens, is small. Accordingly, it is possible to provide a projection zoom lens system that is suited to a reflective-type light modulator such as a DMD and can efficiently take in the projection light from such light modulator and project a bright image. On the other hand, the fourth lens group can move a minute distance as a compensator during zooming, it makes the projection zoom lens system to have favorable compensating of aberrations during zooming and to have superior image forming performance. This means that by using the projection zoom lens system of the present invention, it is possible to provide a projector apparatus that can display bright and clear images, is compact, is equipped with a zoom function, and uses a light modulator, such as a DMD, equipped with elements that form an image by changing the directions of reflection of light.

In the projection zoom lens system comprising the five-groups construction of the present invention, it is preferable for the first lens group to have a negative refractive power, the second lens group to have a positive refractive power, the third lens group to have a positive refractive power, the fourth lens group to have a negative refractive power, and the fifth lens group to have a positive refractive power. The fifth lens group should preferably have a positive refractive power in order to convert the illuminating light into parallel rays, and a negative-positive-positive-negative-positive configuration sequentially from the screen side is the retro-focus configuration and makes the projection zoom lens system with a long back focus on the light modulator side.

In order to improve the aberration performance of the projection zoom lens system with a construction using small number of lenses, it is preferable to introduce one or more aspherical lenses. In the projection zoom lens system of the present invention, the first, second and fourth lens groups do not move, or move by only a short distance, so that there is little fluctuation in the transmitted rays during zooming. Accordingly, it is easy to design the aspherical lens(es), and the aberration performance can be further improved by introducing an aspherical lens or lenses into at least one or a plurality of the first, second, and fourth lens groups.

Out of the first, second, and fourth lens groups, in the first lens group that is closest to the screen, the rays of the image near or around the optical axis pass close to the center of the lens(es), with the rays of the image near or around the periphery passing the periphery of the lens(es). In addition, in a compact zoom lens system, lenses of the first lens group have the greatest diameters. Accordingly, the rays that pass the lens center and lens periphery are different and have some distance, so that the aberration correcting effect of an aspherical surface is great. By providing an aspherical surface or surfaces in the first lens group, it is possible to correct mainly astigmatism, curvature of field, and distortion. In addition, by providing an aspherical surface or surfaces in the fourth lens group, it is possible to correct mainly spherical aberration and coma aberration, so that the lens system in which aberrations are corrected even more favorably can be provided.

The third lens group moves by a large distance as a variator, which would have a large effect on the image formation performance of the entire lens system if the lens group did not effectively correct spherical aberration and curvature of field. Accordingly, it is preferable to use a triplet-type lens group that while having a simple construction can efficiently correct spherical aberration and curvature of field. Therefore, it is preferable that the third lens group has a configuration starting from the screen side of a positive lens that is convex on the screen side, a bi-concave lens (double-concave lens), and a positive lens that is convex on the light modulator side. It is also preferable for a combined focal length fw of the projection zoom lens system at the wide-angle end and a combined focal length f3 of the third lens group to satisfy the following condition.

$$1.4 < f3/fw < 2.1 \quad (A)$$

When the value of f3/fw is out of the range defined by Equation (A), the power of the third lens group is too strong or too weak, which causes a worsening of aberrations such as astigmatism.

Also, with the projection zoom lens system of the present invention, the following range can be set for the moving or traveling distance T4 (mm) of the fourth lens with respect to the combined focal length fw at the wide-angle end and the combined focal length ft at the telephoto end.

$$4.75 < T4 \times ft/fw < 6.6 \quad (B)$$

In order to favorably correct aberrations such as astigmatism, the traveling distance greater than the lower limit shown in Equation (B) above is needed, and in a zoom lens system with a zoom ratio of 1.25, this distance is around 3.8 mm. As the upper limit, the traveling distance of the fourth lens group can be suppressed to around 5 mm or below. Accordingly, it is possible to provide a zoom lens with the field lens and favorable image forming performance where various aberrations are corrected with the position of the entrance pupil hardly moving during zooming.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFFERED EMBODIMENTS

Figure 1:
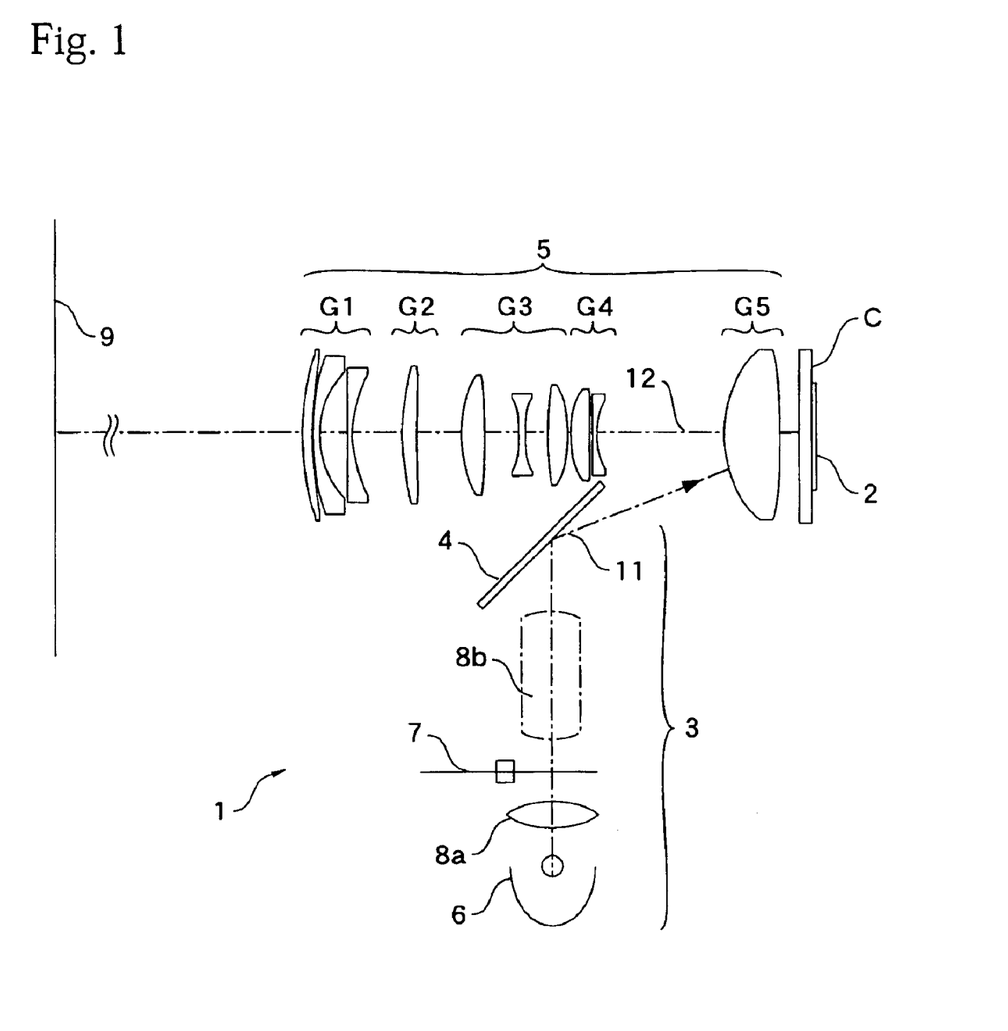
FIG. 1 shows the overall construction of a projector according to the present invention.

FIG. 1 shows the overall construction of a projector that uses a DMD as a light valve. This projector 1 comprises a DMD 2 that is a light modulator, an illumination optical system (illumination system or light source system) 3 that illuminates the DMD 2 with illuminating light (source light) 11, and a projection lens system 5 that projects active light (projection light or modulated light) 12 that has been reflected by the DMD 2 onto a screen 9. The projector 1 shown in FIG. 1 is a single panel video projector, and the illumination system 3 comprises a white light source 6, such as a halogen lamp, and a rotating color splitting filter 7 in the shape of the disc. The light of the three primary colors red, green, and blue is irradiated onto the DMD 2 using time division. By controlling the elements corresponding to the individual pixels at the timing at which the light of the respective colors is shone, a color image is displayed. A condenser lens 8a, an objective optical system 8b, a mirror 4, etc., for illuminating the light 11 from the light source 6 onto the DMD 2 are also arranged as necessary in the illumination system 3 in accordance with the configurations and/or constructions of a variety of projectors.

The DMD 2, a light modulator, is equipped with a plurality of elements (digital mirrors) and forms an image by changing the direction of reflections of the illuminating light 11. In the projector 1 that uses the DMD 2, the image circle is reduced when the normal of the DMD 2 matches the optical axis of the projection lens system 5, so that the diameter of the projection lens system 5 can be reduced. In addition, it becomes easy to separate the active light and the inactive light. Accordingly, the angle of incidence for the DMD 2 from the illumination system 3 is limited and the optical axis of the illumination system 3 becomes almost the same direction as the optical axis of the projection lens system 5. This means that it is necessary to make the back focus of the projection lens system 5 quite long in order to prevent the projection lens system 5 from being affected by the illumination system 3. It is also necessary to sufficiently reduce the diameter of the actual final lens positioned on the DMD 2 side of the projection lens system 5 in order to separate the active projected light 12 and the inactive light. The optical systems of the projector of the present embodiment are designed based on these conditions.

As shown in FIG. 1, the projection lens system 5 of the present embodiment includes a lens group G5, which is disposed on the front surface or side of the DMD 2, and is a zoom lens system constructed of five lens groups which in order from the screen 9 side are a first lens group G1, a second lens group G2, a third lens group G3, a fourth lens group G4, and the fifth lens group G5. Of these, the second lens group G2, the third lens group G3, and the fourth lens group G4 move during zooming or varying power. The fifth lens group G5 is a field lens that transmits not only the projection light 12 but also the illuminating light 11 and, in combination with the objective optical system 8b of the illumination system 3, acts as an illuminating light system that irradiates the illuminating light 11 emitted from the illumination system 3 onto the light valve 2.

First Embodiment

Figure 2A:
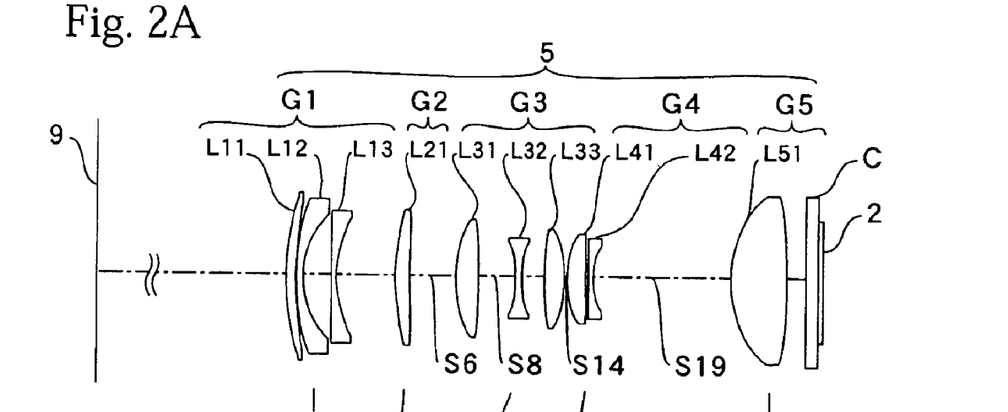
FIGS. 2A and 2B show the construction of the projection zoom lens system according to the first embodiment of the present invention.
Figure 2B:
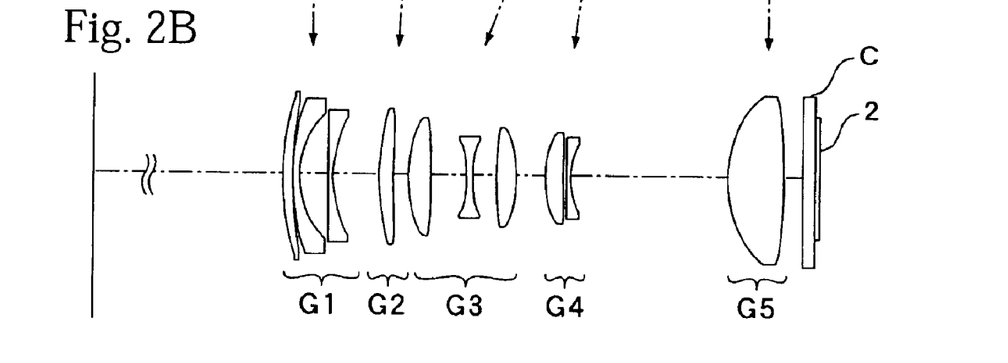

The lens arrangement of the projection lens system 5 according to the present invention is shown in FIG. 2 at the wide-angle end (FIG. 2A) and at the telephoto end (FIG. 2B). In the projection lens system 5 of the present embodiment, the lenses are grouped into the five lens groups G1, G2, G3, G4, and G5 on this order from the screen 9 side as described above and are composed of a total of ten lenses numbered L11 to L51. Detailed data on the respective lenses is given later in this specification.

The first lens group G1 on the screen side has an overall negative refractive power and is composed of a positive meniscus lens L11 that is positioned closest to the screen (i.e., at the front) and is convex on the screen side, a negative meniscus lens L12 that is convex on the screen side, and another negative meniscus lens L13 that is convex on the screen side, such lenses being aligned in this order. Also, out of these lenses, both surfaces (the third surface and the fourth surface) of the second lens L12 are aspherical. The first lens group G1 is fixed during zooming and is a focusing lens group that only moves for focusing.

The second lens group G2 positioned on the DMD 2 side of the first lens group G1 has an overall positive refractive power and is composed of a double-convex positive lens L21. The second lens group G2 mainly functions as a compensator that compensates various aberrations by moving slightly towards the screen 9 during zooming from the wide-angle end to the telephoto end.

The third lens group G3 has an overall positive refractive power, and is composed, from the screen 9 side, of a positive lens L31 that is extremely convex on the screen 9 side, a double-concave negative lens L32, and convex positive lens L33 that is extremely convex on the light valve 2 side. The third lens group G3 has a simple construction known as a triplet, but can effectively compensate spherical aberration and curvature of field. The third lens group G3 mainly functions as a variator which, during zooming from the wide-angle end to the telephoto end, moves or travels significantly towards the screen 9 side and through such movement achieves a variable power effect.

The fourth lens group G4 has an overall negative refractive power, and is composed, from the screen 9 side, of a positive meniscus lens L41 that is convex on the screen 9 side and a negative meniscus lens L42 that is also convex on the screen 9 side. Of these lenses, the second lens L42 is aspherical on both surfaces. The fourth lens group G4 mainly functions as a compensator that compensates various aberrations by moving or traveling slightly towards the screen 9 during zooming from the wide-angle end to the telephoto end. In this lens system 5, the second, third and fourth lens groups G2, G3 and G4 move towards the screen 9 side when zooming is carried out from the wide-angle end to the telephoto end.

The fifth lens group G5 has an overall positive refractive power and is composed of a positive lens L51 that is extremely convex on the screen 9 side. This lens group G5 is a shared or common lens functions as the field lens that is commonly used by the illumination optical system 3 and the projection lens system 5, and does not move with respect to the light valve 2.

In the lens data given below, "ri" represents the radius of curvature (mm) of each lens that is arranged in order from the screen side, "Si" represents the distance (mm) between the lens surfaces of the lenses arranged in order from the screen side, "ni" represents the refractive index or rate (d line) of each lens arranged in order from the screen side, and "vi" represents the Abbe number (d line) of each lens arranged in order from the screen side. Also, "f" represents the combined focal length of the projection lens system 5 of the present embodiment ("fw" represents the combined focal length at the wide-angle end and "ft" represents the combined focal length at the telephoto end), and f1 to f5 represent the combined focal lengths of the respective lens groups G1 to G5. These values are for the case where the distance from the projection zoom lens 5 to the screen is 2 m.

Lens Data (No.1)

| No. | ri | si | ni | vi | |
|---|---|---|---|---|---|
| 1 | 67.483 | 2.67 | 1.78971 | 43.93 | lens L11 |
| 2 | 105.966 | 0.20 | | | |
| 3 | 71.917 | 1.80 | 1.73201 | 54.67 | lens L12 |
| 4 | 21.604 | 7.19 | | | |
| 5 | 1354.856 | 1.20 | 1.61495 | 58.58 | lens L13 |
| 6 | 29.310 | changeable | | | |
| 7 | 65.153 | 3.61 | 1.83874 | 37.34 | lens L21 |
| 8 | −519.371 | changeable | | | |
| 9 | 37.524 | 5.59 | 1.81031 | 40.73 | lens L31 |
| 10 | −149.833 | 9.10 | | | |
| 11 | −32.108 | 1.20 | 1.76785 | 26.61 | lens L32 |
| 12 | 33.36 | 6.22 | | | |
| 13 | 79.398 | 5.00 | 1.77582 | 49.62 | lens L33 |
| 14 | −28.776 | changeable | | | |
| 15 | 29.911 | 4.28 | 1.74651 | 49.33 | lens L41 |
| 16 | 29590.411 | 0.54 | | | |
| 17 | 316.781 | 1.20 | 1.70386 | 30.05 | lens L42 |
| 18 | 22.003 | changeable | | | |
| 19 | 32.000 | 14.00 | 1.51852 | 64.20 | lens L51 |
| 20 | −110.000 | 4.88 | | | |
| 21 | Flat | 3.00 | 1.48897 | 70.44 | cover glass C |
| 22 | Flat | | | | |

The third, fourth, fifteenth, and sixteenth surfaces are aspherical, and the aspherical coefficients of these surfaces are as follows. The aspherical equation is given below.

$$x=(1/r)Y^2/[1+\{1-(1+K)(1/r)^2Y^2\}^{1/2}]+AY^4+BY^6+CY^8+DY^{10}$$

The Third Surface
R=71.917
K=0.0000
A=8.1882×10$^{-6}$, B=−2.8680×10$^{-8}$
C=4.9391×10$^{-11}$, D=−2.5052×10$^{-14}$ The Fourth Surface
R=21.604
K=0.0000
A=5.2263×10$^{-6}$, B=−2.7242×10$^{-8}$
C=−4.8568×10$^{-11}$, D=1.4544×10$^{-13}$ The Fifteenth Surface
R=29.911
K=0.0000
A=−5.9351×10$^{-6}$, B=−6.2041×10$^{-8}$
C=1.0272×10$^{-10}$, D=−4.0181×10$^{-12}$ The Sixteenth Surface
R=29590.411
K=0.0000
A=−2.1016×10$^{-6}$, B=−4.0598×10$^{-8}$
C=−4.0886×10$^{-10}$, D=−1.4094×10$^{-12}$ Various coefficients during zooming of the projection zoom lens system of the present embodiment are as follows.

| | Wide angle | Medium | Telephoto |
|---|---|---|---|
| f | 26.00 | 29.26 | 32.50 |
| s6 | 13.05 | 11.68 | 10.95 |
| s8 | 11.31 | 7.35 | 3.26 |
| s14 | 1.00 | 4.01 | 7.21 |
| s19 | 32.95 | 35.27 | 36.89 |

The focal lengths of the respective lens groups are as follows.

| | |
|---|---|
| f1 = | −24.26 |
| f2 = | 69.22 |
| f3 = | 48.36 |
| f4 = | −499.06 |
| f5 = | 49.47 |

In the lens system, the distance traveling T4 of the fourth lens group G4 is 3.94 mm, the focal length (fw) at the wide-angle end is 26.0 mm, the focal length (ft) at the telephoto end is 32.5 mm, the overall length is 130 mm, and the zoom ratio is 1.25. Accordingly the conditions that are defined by Equations (A) and (B) above are as shown below.

$$f3/fw=1.86 \qquad \text{Equation (A)}$$

$$T4 \times ft/fw=4.925 \qquad \text{Equation (B)}$$

Figure 3:
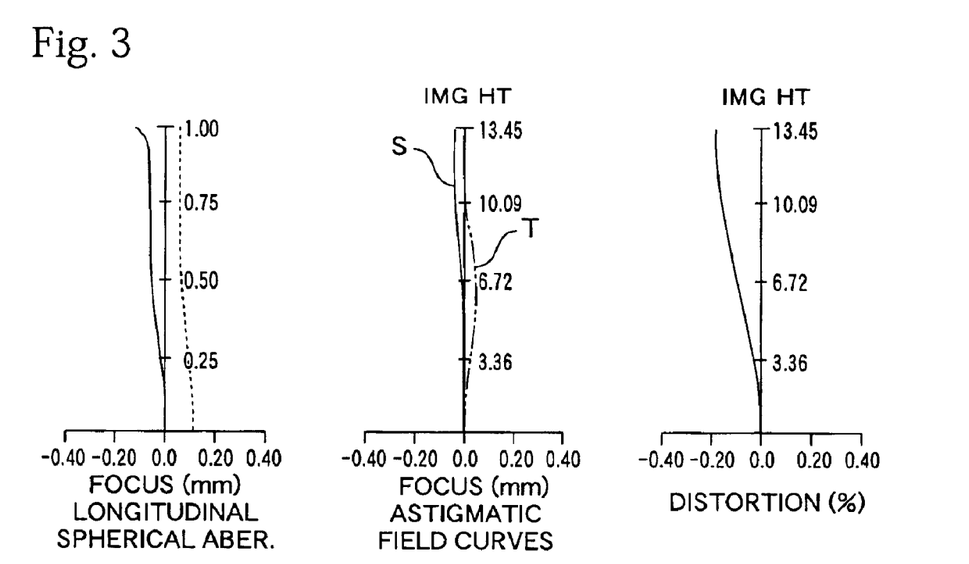
FIG. 3 shows longitudinal aberration graphs of the lens system shown in FIG. 2 at the wide-angle end.
Figure 4:
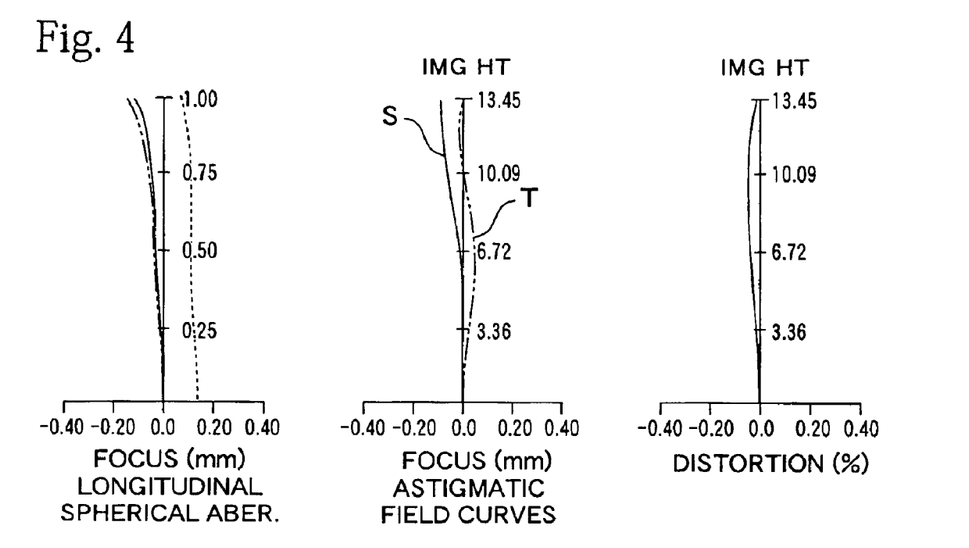
FIG. 4 shows longitudinal aberration graphs of the lens system shown in FIG. 2 at the telephoto end.
Figure 5:
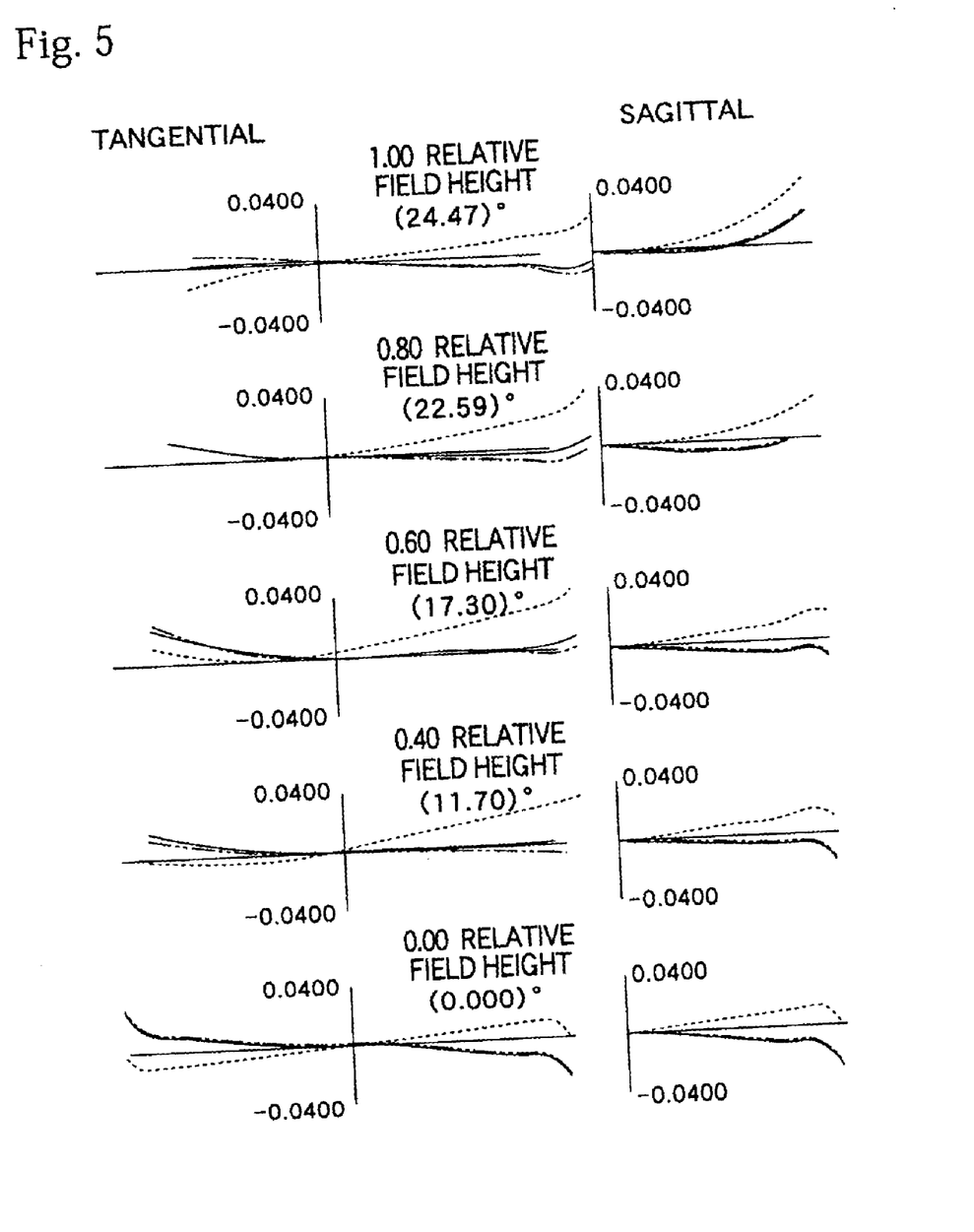
FIG. 5 shows lateral aberration graphs of the lens system shown in FIG. 2 at the wide-angle end.
Figure 6:
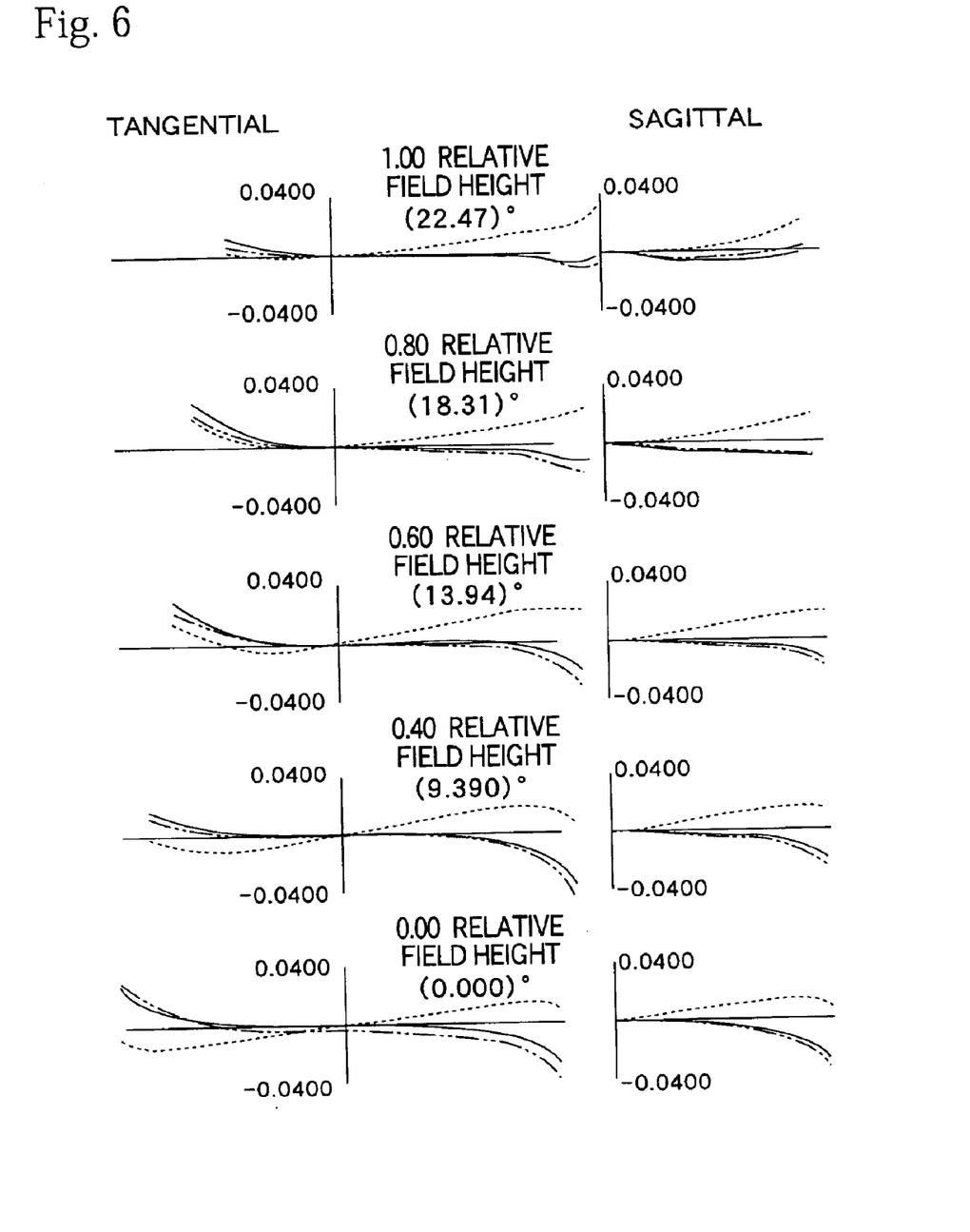
FIG. 6 shows lateral aberration graphs of the lens system shown in FIG. 2 at the telephoto end.

FIGS. 3 to 6 show various aberrations of the projection lens system 5 of the present embodiment. FIG. 3 shows the spherical aberration, astigmatism, and distortion at the wide-angle end of the projection lens system 5. FIG. 4 shows the spherical aberration, astigmatism, and distortion at the telephoto end. Also, FIG. 5 shows the lateral aberrations at the wide-angle end, and FIG. 6 shows the lateral aberrations at the telephoto end. Values of the spherical aberration and the lateral aberration are shown for each of the following wavelengths: 656.2 nm (dotted line); 546.1 nm (solid line); and 486.1 nm (dot-dash line). As can be understood from these drawings, for the lens system 5 of the present embodiment, between the wide-angle end and the telephoto end, astigmatism is sufficiently suppressed to a range of around ±0.02 mm and lateral aberration is sufficiently suppressed to a range of ±0.04 mm. Accordingly, it can be seen that the projection lens system 5 of the present embodiment is a zoom lens system that has an extremely high image forming performance as a zoom lens with a zoom ratio of 1.25.

This lens system 5 is a zoom lens system with a five-group construction, and neither the first lens group G1 located on the screen side nor the fifth lens group G5 located on the light valve 2 side moves during zooming and for which the overall length (130 mm in the present embodiment) does not change due to variable power. Accordingly, it is sufficient for the first lens group G1 to handle only focusing, which simplifies the mechanism of the zoom lens system, and the fifth lens group G5 can be used as the field lens that is commonly used by the illumination optical system 3 and the projection lens system 5.

The third lens group G3 travels mainly for zooming, while the fourth lens group G4 and the second lens group G2 are mainly used for compensating aberrations. Accordingly, the distance traveling of the fourth lens group G4 is extremely small at around 3,94 mm in spite of the zoom ratio being around 1.25.

In the projector 1 that uses, as the light valve 2 that is a device equipped with a plurality of micromirrors for generating an image by changing the directions of reflection of the illuminating light 11 from the illumination optical system 3, the traveling distance of the entrance pupil position with respect to the projected light 12, which is incident from the light valve 2 via the fifth lens group G5 fixed as the field lens, should preferably be small in order for the projection light 12 from the light valve 2 to be efficiently taken in and the inactive light to not be taken in. On the other hand, in order to increase the zoom ratio, significant traveling of variator lens group is required, and the movement of the lens groups for compensating the movement of the variator lens group also increases.

In the present embodiment, the second lens group G2 and the fourth lens group G4 are provided for compensating aberrations due to the movement of the third lens group G3 and the lens group G2 and G4 are positioned before and after the third lens group G3 respectively. Therefore, aberrations can be sufficiently compensated while suppressing the movement of the fourth lens group G4. Accordingly, the traveling distance T4 of the fourth lens group G4 in the present embodiment is designed so as to be kept within the range shown by Equation (B).

In addition, a triplet configuration, which has a simple construction and high corrective ability for aberrations, is applied for the third lens group G3 that moves significantly during magnification and keeping its power within the range shown by Equation (A). Therefore, the zooming lens system 5 can be provided with a sufficient zooming ratio and a high image forming performance where aberration is effectively corrected cooperation with the other lens groups.

Lenses (L12 and L41) with aspherical surfaces on both sides are arranged in the first lens group G1 and the fourth lens group G4 that move only short distances. These lenses do not move or move by only a short distance when zooming, movement of the rays though the lenses are also little due to the variable power, which makes designing the aspherical lenses simple and makes it possible to efficiently correct aberrations using the aspherical lenses. In addition, as described above, the first lens group G1 that is closest to the screen has a large lens diameter and a difference is present between the optical axis light and the peripheral light, so that it is suited to correcting astigmatism, curvature of field, and distortion. Also, by introducing an aspherical surface or surfaces into the fourth lens group G4, spherical aberration and coma aberration mainly can be corrected. This means that the zoom lens of the present embodiment achieves a favorable aberration performance using a total of just ten lenses.

In addition, the powers of the respective lens groups G1 to G5 that compose the present zoom lens system are negative, positive, positive, negative, and positive in order starting from the screen side. A configuration of lens groups with such powers can be thought of as a retrofocus-type lens configuration, which makes it easy to lengthen the back focus on the light valve 2 side. Accordingly, it is possible to provide a favorable projection lens system 5 for the light valve 2 that uses micromirrors and for which inputting and outputting lights in parallel as far as possible.

As mentioned above, the zoom lens system 5 of the present embodiment has a long back focus that is suited to a micromirror device and suitable configuration of five lens groups, it is possible to provide a projection zoom lens whose overall length does not change, whose construction is simple, and in which the distance moved by the entrance pupil during zooming is short. It is also simple to introduce an aspherical lens or lenses, and by suppressing the powers of the third lens group and the fourth lens group to within the ranges given in Equations (A) and (B), the aberration performance is also made extremely favorable.

Second Embodiment

Figure 7A:
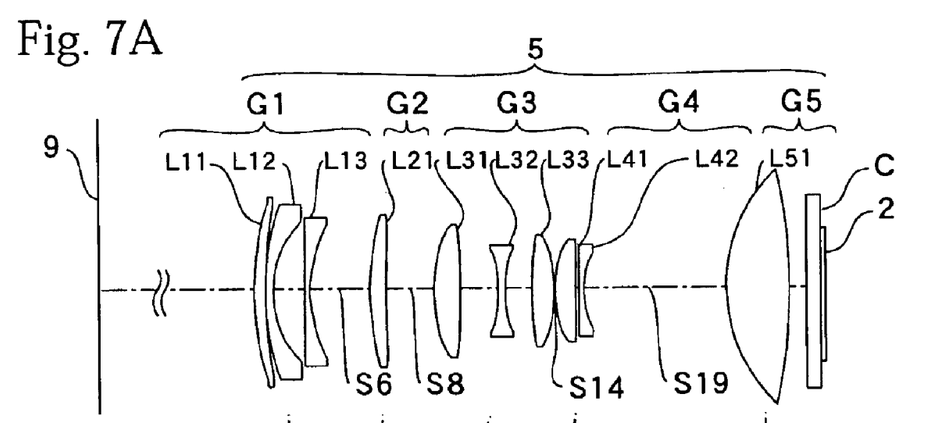
FIGS. 7A and 7B show the construction of the projection zoom lens system according to the second embodiment of the present invention.
Figure 7B:
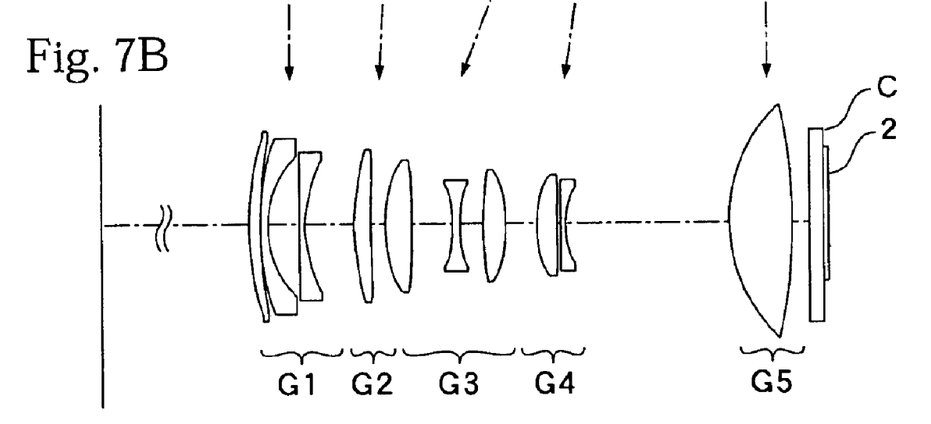

FIGS. 7A and 7B show another embodiment of a projection zoom lens system according to the present invention. The lens system 5 of the present embodiment is also composed of five groups using ten lenses numbered L11 to L51. The refractive powers of the respective lens groups G1 to G5 are the same as the zoom lens described above, and the types of the individual lenses that compose these lens groups G1 to G5 are the same as the lens system described above, apart from the lens L13 of the first lens group G1 that is a double-convex positive lens, the lens L41 of the fourth lens group G4 that is also a double-convex positive lens, and the lens L42 of the fourth lens group G4 that is a double-concave negative lens.

The lens data of the present embodiment is as shown below. It should be noted that in the following embodiment, the various reference codes are the same as in the first embodiment described above, so that description of such has been omitted.

Lens Data (No.2)

| No. | ri | si | ni | vi | |
|---|---|---|---|---|---|
| 1 | 68.098 | 3.10 | 1.81031 | 40.73 | lens L11 |
| 2 | 134.757 | 0.19 | | | |
| 3 | 64.328 | 1.90 | 1.73201 | 54.67 | lens L12 |
| 4 | 21.111 | 7.65 | | | |
| 5 | −401.365 | 1.50 | 1.68051 | 55.52 | lens L13 |
| 6 | 29.125 | changeable | | | |
| 7 | 121.218 | 3.45 | 1.83874 | 37.34 | lens L21 |
| 8 | −136.618 | changeable | | | |
| 9 | 33.545 | 6.40 | 1.81031 | 40.73 | lens L31 |
| 10 | −128.559 | 7.91 | | | |
| 11 | −33.122 | 1.20 | 1.76785 | 26.61 | lens L32 |
| 12 | 32.923 | 6.10 | | | |
| 13 | 67.256 | 5.40 | 1.77582 | 49.62 | lens L33 |
| 14 | −30.515 | changeable | | | |
| 15 | 34.694 | 4.35 | 1.74651 | 49.33 | lens L41 |
| 16 | −218.962 | 0.48 | | | |
| 17 | −1244.584 | 1.20 | 1.70386 | 30.05 | lens L42 |
| 18 | 22.582 | changeable | | | |
| 19 | 30.000 | 14.00 | 1.51852 | 64.20 | lens L51 |
| 20 | −120.000 | 4.88 | | | |
| 21 | Flat | 3.00 | 1.48897 | 70.44 | cover glass C |
| 22 | Flat | | | | |

Both surfaces (the third surface and the fourth surface) of the lens L12 and both surfaces (the fifteenth surface and the sixteenth surface) of the lens L41 are aspherical, with the aspherical surface coefficients being as shown below.

The Third Surface

R=64.328
K=0.0000
A=3.1677×$10^{-6}$, B=−8.7070×$10^{-9}$
C=1.5563×$10^{-11}$, D=−9.5080×$10^{-15}$

The Fourth Surface

R=21.111
K=0.0000
A=4.1576×$10^{-7}$, B=−1.7513×$10^{-8}$
C=6.1085×$10^{-12}$, D=−5.5556×$10^{-14}$

The Fifteenth Surface

R=34.694
K=0.0000
A=−9.0100×$10^{-6}$, B=−8.5555×$10^{-9}$
C=−7.2886×$10^{-10}$, D=−4.6879×$10^{-13}$

The Sixteenth Surface

R=−218.962
K=0.0000
A=−3.4934×$10^{-6}$, B=2.8671×$10^{-8}$
C=−1.5456×$10^{-9}$, D=4.2795×$10^{-12}$

Various values for the projection zoom lens system of the present embodiment during magnification are shown below.

|  | Wide angle | Medium | Telephoto |
|---|---|---|---|
| f | 26.05 | 29.25 | 32.45 |
| s6 | 13.58 | 12.66 | 12.25 |
| s8 | 8.67 | 4.76 | 0.80 |
| s14 | 1.00 | 3.26 | 5.71 |
| s19 | 34.00 | 36.57 | 38.49 |

The focal lengths of the respective lens groups are as follows.

| f1 = | −22.91 |
|---|---|
| f2 = | 77.05 |
| f3 = | 43.23 |
| f4 = | −228.22 |
| f5 = | 47.81 |

In this zoom lens system 5, the traveling distance T4 of the fourth lens group is 4.49 mm, the focal length (fw) at the wide-angle end is 26.05 mm, the focal length (ft) at the telephoto end is 32.45 mm, the overall length is 130 mm, and the zoom ratio of the zoom lens is 1.25. Accordingly the conditions that are defined by Equations (A) and (B) above are as shown below.

$$f3/fw=1.66 \qquad \text{Equation (A)}$$

$$T4 \times ft/fw=5.61 \qquad \text{Equation (B)}$$

Figure 8:
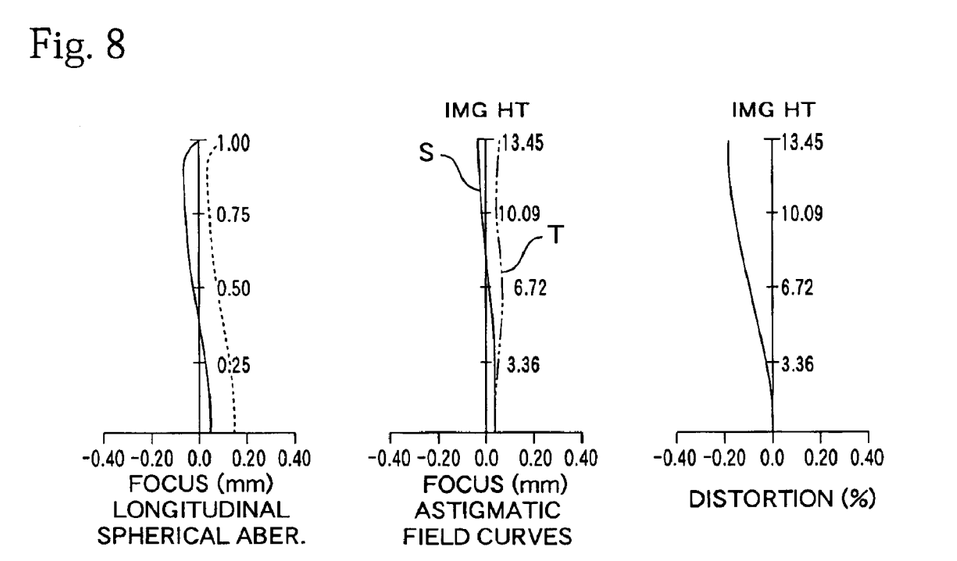
FIG. 8 shows longitudinal aberration graphs of the lens system shown in FIG. 7 at the wide-angle end.
Figure 9:
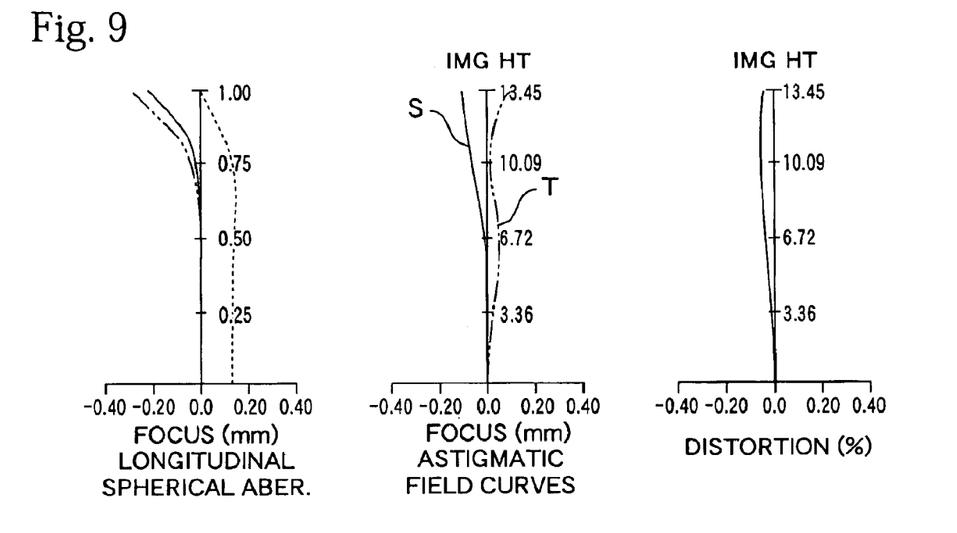
FIG. 9 shows longitudinal aberration graphs of the lens system shown in FIG. 7 at the telephoto end.
Figure 10:
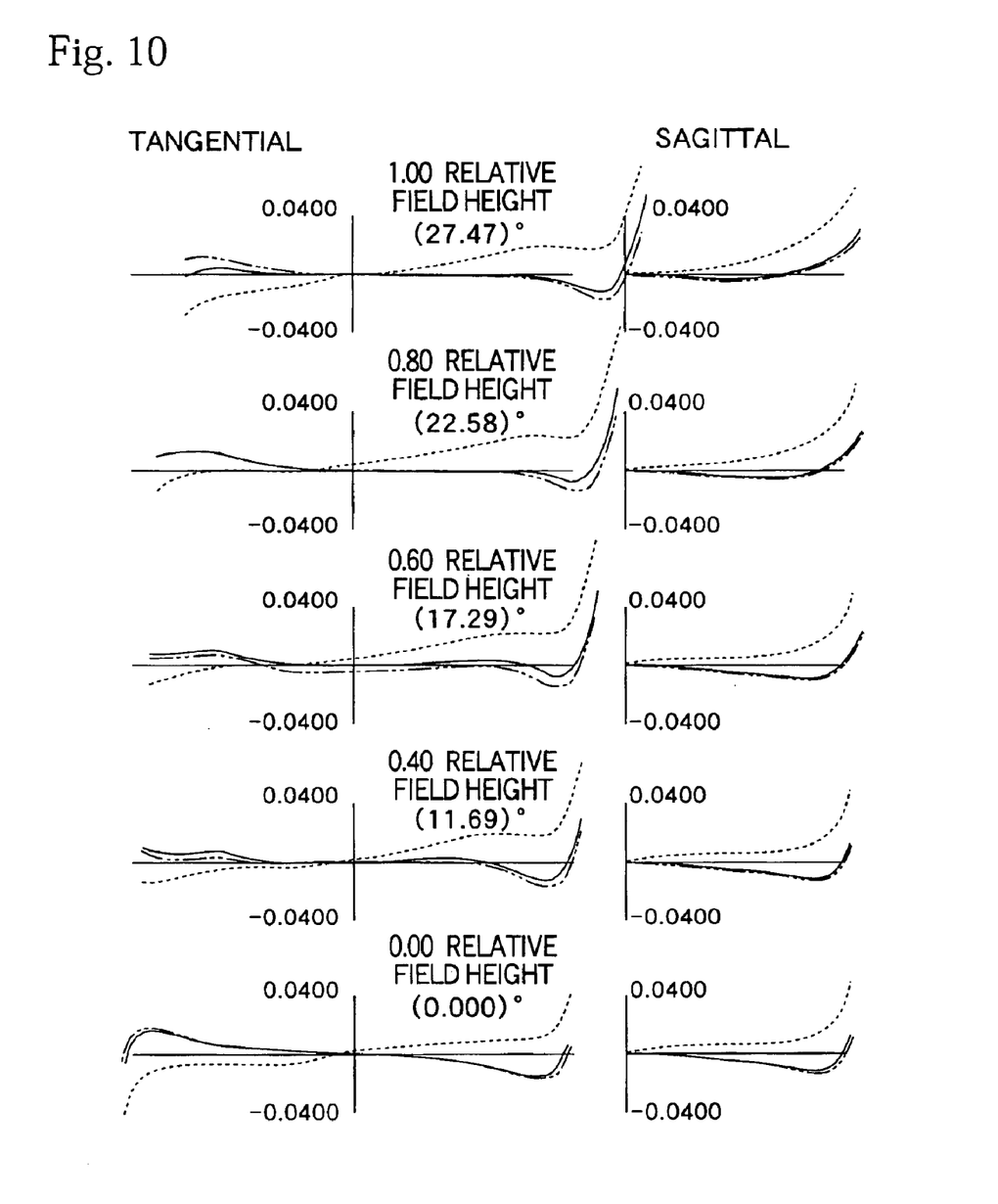
FIG. 10 shows lateral aberration graphs of the lens system shown in FIG. 7 at the wide-angle end.
Figure 11:
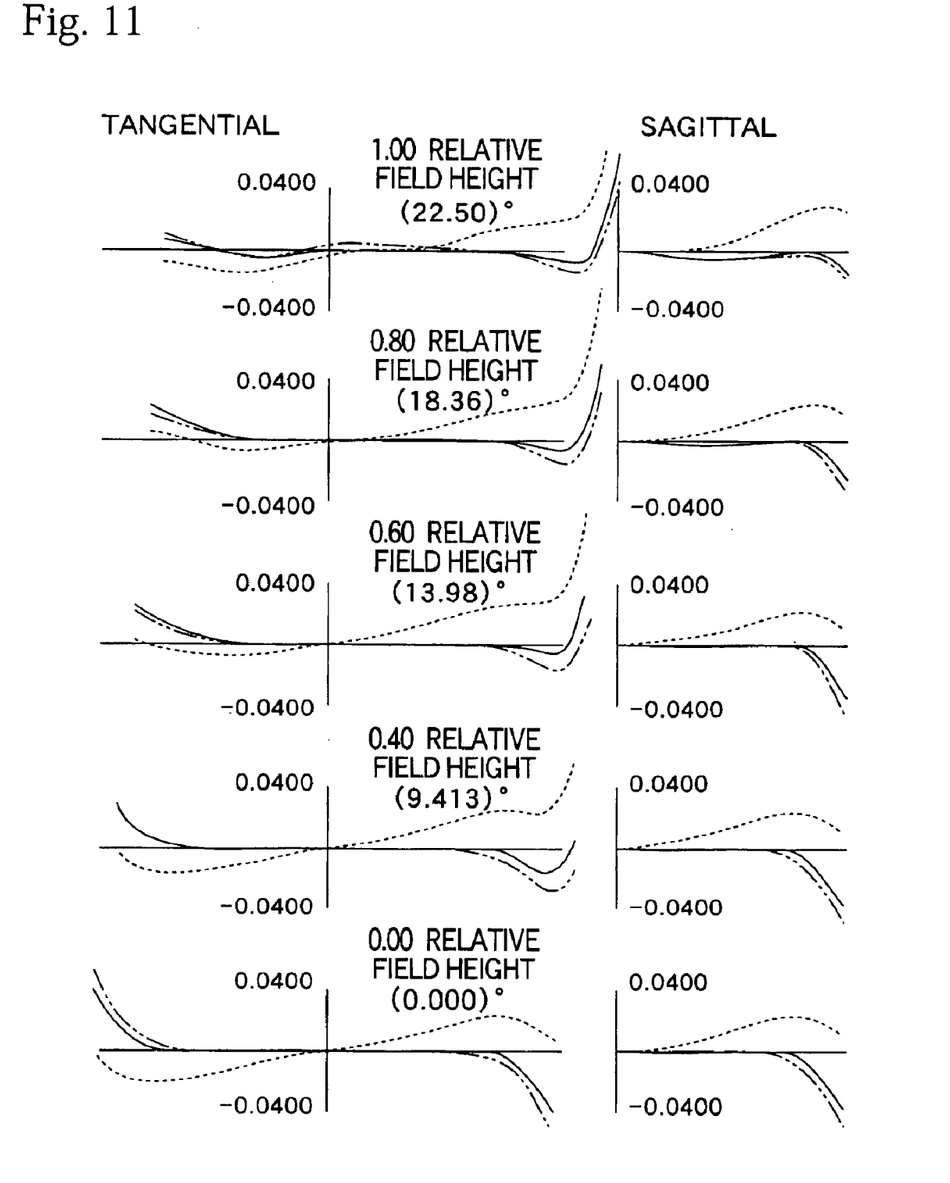
FIG. 11 shows lateral aberration graphs of the lens system shown in FIG. 7 at the telephoto end.

FIGS. 8 to 11 show various aberrations for this zoom lens system 5. FIG. 8 shows the spherical aberration, astigmatism, and distortion at the wide-angle end of the zoom lens system 5. FIG. 9 shows the spherical aberration, astigmatism, and distortion at the telephoto end. FIG. 10 shows the lateral aberrations at the wide-angle end, and FIG. 11 shows the lateral aberrations at the telephoto end. Values of the spherical aberration and the lateral aberration are shown for the wavelengths as the embodiment described above. As can be understood from these drawings, between the wide-angle end and the telephoto end, in this lens system 5 also, astigmatism is sufficiently suppressed to within a range of around ±0.02 mm and lateral aberration is suppressed to within a range of 0.04 mm. Accordingly, it can be seen that the zoom lens system 5 of the present embodiment is a zoom lens system that has an extremely high image forming performance as a zoom lens with a zoom ratio of 1.25.

Furthermore, the traveling distance T4 of the fourth lens group is 4.49 mm in the present embodiment, which is slightly longer than in the first embodiment but at below 5 mm, is still extremely small. Accordingly, the zoom lens system 5 of the present embodiment is also a favorable zoom lens system for the projector 1 that uses a micromirror device as the light valve 2.

As described above, the projection zoom lens system of the present invention is suited to a projector that uses a light modulator, such as a DMD, that forms images by reflecting light. This zoom lens system includes a fixed fifth lens group that is positioned on the light modulator side and is used as the field lens that transmits the illuminating light and the projection light and a first lens group for focusing that is fixed during zooming, and is constructed of five groups arranged in negative, positive, positive, negative, positive order from the screen side. In the present lens system, the third lens group moves significantly during zooming mainly as a variator, the second and fourth lens groups travel only so small distances as compensators but can correct various aberrations so well. This means that the movement of the fourth lens group that is the entrance pupil for the projection light outputted from the light valve is small, so that the active projection light is efficiently taken in and a projection zoom lens system that can project bright, clear images can be provided.

What is claimed is:

1. A projection zoom lens system that projects, onto a screen, projection light from a light modulator, which includes a plurality of elements and forms an image by changing directions of reflection of illuminating light from an illuminating optical system using the plurality of elements,
   the projection zoom lens system including first, second, third, fourth, and fifth lens groups arranged in this order from the screen side,
   the fifth lens group being a common lens group that is disposed on the front side of the light modulator, transmits the illuminating light and the projection light, and does not move during zooming,
   the first lens group being a focusing lens group that moves in order to adjust a focus and does not move during zooming,
   the third lens group being a zooming lens group and zooming effect is mainly produced by movement of this group, and
   the second and fourth lens groups being compensating lens groups that mainly compensate aberrations by moving when zooming is carried out,
   wherein at least one of the first, second, and fourth lens groups includes an aspherical lens.

2. A projection zoom lens system according to claim 1, wherein the first lens group has a negative refractive power, the second lens group has a positive refractive power, the third lens group has a positive refractive power, the fourth lens group has a negative refractive power, and the fifth lens group has a positive refractive power.

3. A projection zoom lens system according to claim 1, wherein the first and fourth lens groups include an aspherical lens.

4. A projection zoom lens system according to claim 2, wherein the second, third and fourth lens groups move towards the screen when zooming is carried out from a wide-angle end to a telephoto end.

5. A projector comprising a projection zoom lens system according to claim 1, the light modulator, and the illumination optical system.

6. A projection zoom lens system that projects, onto a screen, projection light from a light modulator, which includes a plurality of elements and forms an image by changing directions of reflection of illuminating light from an illuminating optical system using the plurality of elements,
   the projection zoom lens system including first, second, third, fourth, and fifth lens groups arranged in this order from the screen side,
   the fifth lens group being a common lens group that is disposed on the front side of the light modulator, transmits the illuminating light and the projection light, and does not move during zooming,
   the first lens group being a focusing lens group that moves in order to adjust a focus and does not move during zooming, the third lens group being a zooming lens group and zooming effect is mainly produced by movement of this group, and the second and fourth lens groups being compensating lens groups that mainly compensate aberrations by moving when zooming is carried out, wherein the first lens group has a negative refractive power, the second lens group has a positive refractive power, the third lens group has a positive refractive power, the fourth lens group has a negative refractive power, and the fifth lens group has a positive refractive power, and wherein the third lens group includes, sequentially from the screen side, a positive lens that is convex on the screen side, a double-concave negative lens, and a positive lens that is convex on the light modulator side.

7. A projection zoom lens system according to claim 6, wherein a focal length fw of the projection zoom lens system at the wide-angle end and a focal length f3 of the third lens group satisfy the following condition $$1.4 < f3/fw < 2.1.$$

8. A projection zoom lens system that projects, onto a screen, projection light from a light modulator, which includes a plurality of elements and forms an image by changing directions of reflection of illuminating light from an illuminating optical system using the plurality of elements, the projection zoom lens system including first, second, third, fourth, and fifth lens groups arranged in this order from the screen side, the fifth lens group being a common lens group that is disposed on the front side of the light modulator, transmits the illuminating light and the projection light, and does not move during zooming, the first lens group being a focusing lens group that moves in order to adjust a focus and does not move during zooming, the third lens group being a zooming lens group and zooming effect is mainly produced by movement of this group, and the second and fourth lens groups being compensating lens groups that mainly compensate aberrations by moving when zooming is carried out, wherein the first lens group has a negative refractive power, the second lens group has a positive refractive power, the third lens group has a positive refractive power, the fourth lens group has a negative refractive power, and the fifth lens group has a positive refractive power, and wherein a focal length fw of the projection zoom lens system at the wide-angle end, a focal length ft of the projection zoom lens system at the telephoto end, and a distance T4 of the fourth lens group traveling during zooming satisfy the following condition $$4.75 < T4 \times ft/fw < 6.6.$$

* * * * *